Dec. 27, 1949
M. H. SWEET
2,492,901
BIASED DIODE LOGARITHMIC COMPENSATING
CIRCUIT FOR ELECTRICAL INSTRUMENTS
Filed May 7, 1946
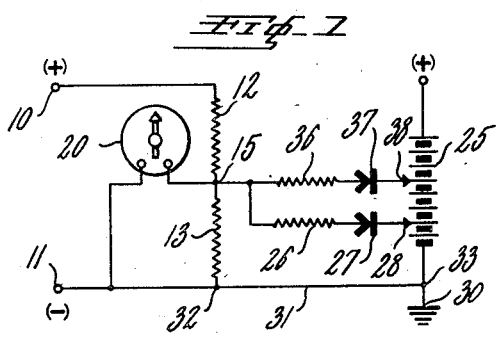
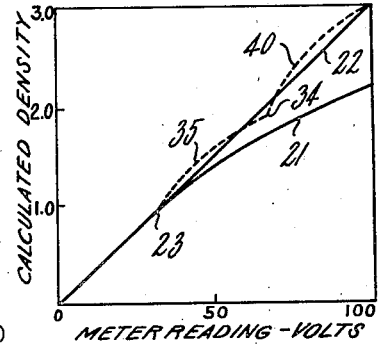
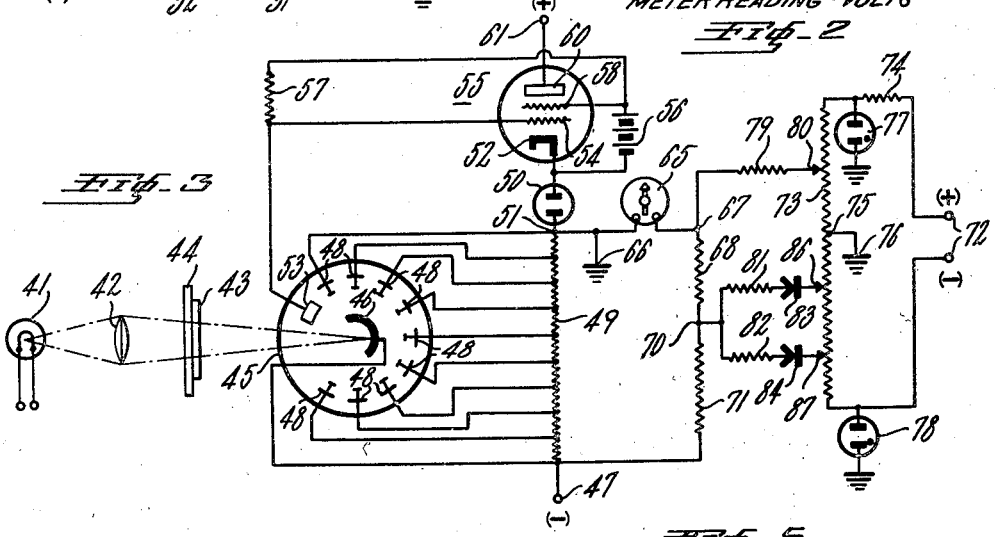
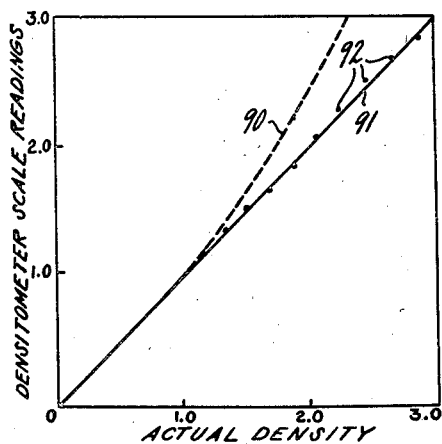
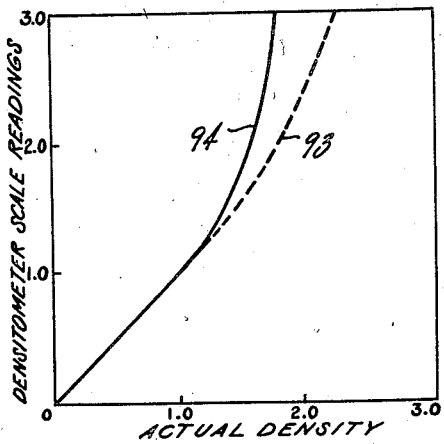
INVENTOR
MONROE H. SWEET
BY
ATTORNEY Patented Dec. 27, 1949

2,492,901

UNITED STATES PATENT OFFICE 2,492,901

BIASED DIODE LOGARITHMIC COMPENSATING CIRCUIT FOR ELECTRICAL INSTRUMENTS

Monroe H. Sweet, Binghamton, N. Y., assignor to General Aniline & Film Corporation, New York, N. Y., a corporation of Delaware Application May 7, 1946, Serial No. 667,814

4 Claims. (Cl. 171—95)

This invention relates to compensating circuits for electrical instruments and more particularly to compensating circuits particularly adapted for use in direct reading densitometers.

In many mensuration operations, frequently the response of a meter does not bear a strictly linear relation to the value of the quantity being measured over the complete meter scale or range. Consequently, portions of the meter scale are unduly expanded or unduly contracted, making it difficult to read accurately. Also, in many cases it is desirable in a normally linear reading instrument to expand a portion of its scale for the purpose of more accurately observing indications in certain critical ranges.

Such conditions are particularly true in measuring densities of photographic film. It is desirable, for efficient operation, that such densities be measured rapidly and directly. There have recently been developed several types of direct reading densitometers in which the density may be read directly on an instrument having a substantially uniformly graduated scale. As density is an inverse logarithmic function of the light transmission value of a specimen, logarithmic compensating means are provided whereby the meter response represents a substantially direct function of the density of the sample. Without such logarithmic compensating means, the meter scale would be greatly expanded near one end and correspondingly cramped near the other end, as is customary in devices indicating logarithmically varying quantities.

Even with such logarithmic compensation, the uniformity of graduation of the meter scale is not absolutely linear in that the voltmeter or milliammeter used as the indicator does not have a truly linear response over an adequate range to variations in the sample density.

It is therefore among the objects of this invention to correct non-linearity of an indicating instrument by providing a compensating circuit for altering the ratio of response; to provide a compensating circuit effective to obtain a linear response ratio in a non-linearly responsive electrical meter; to provide a compensating circuit for densitometers for obtaining a more accurate linearity of response of an indicating meter to variations in sample density; to provide a compensating circuit for meters whereby the ratio or response of the meter may be varied over preselected portions of its scale to expand or contract its scale as desired at such portions.

These, and other objects, novel features and advantages of the invention will be apparent from the following description and the accompanying drawing. In the drawing:

Fig. 1 is an electric circuit diagram illustrating the principles of the present invention.

Fig. 2 is a set of curves explaining the principles of the present invention.

Fig. 3 is an electric circuit diagram of a direct reading densitometer incorporating the present invention.

Fig. 4 is a set of curves illustrating the operation of the circuit shown in Fig. 3.

Fig. 5 is another set of curves illustrating the operation of a circuit similar to that of Fig. 3 when used to expand a portion of the meter scale.

According to the principles of the present invention, compensation of any desired degree is accomplished by electrically varying the circuit relation of one or more impedances with respect to an indicating meter. For example, in an instrument having a scale which is linear over the initial portion of its range and nonlinear over the remainder of the scale, means are provided for altering the effective impedance determining the meter response at the point where the scale, or meter response, changes from linear to non-linear indication or vice versa. The effective impedance of the meter circuit is altered by shunts which are part of the circuit and become instantaneously effected only at predetermined current levels in accordance with the compensation requirement of the particular meter or the change desired in the indication thereof. Several such shunts preferably in the form of resistances, can be incorporated in the meter circuit and condition to be effective at predetermined points on its scale to attain a very close approximation to linearity.

However, the invention is not limited to correcting non-linearity in meter response. It is applicable to circuits in general for altering the effective impedance of various components at desired current or voltage levels without switching operations. It may also be applied to modify the range and degree of indication of various types of indicating instruments. For example, in densitometer applications it may be desirable to expand the scale of the meter over certain portions, so that more accurate readings may be taken over such portions. By using the principles of the present invention, such expansion, or contraction if desired, may be effected at any portion of the meter scale.

The principles of the invention will be best understood by reference to Figs. 1 and 2. Fig. 1 may represent, for example, the output circuit of a direct reading densitometer of the type described and claimed in my copending applications Serial No. 570,627, filed December 30, 1944, now Patent No. 2,478,163, issued August 2, 1949, or Serial No. 647,932, filed February 15, 1946, now Patent No. 2,457,747, issued December 28, 1948. The output of the densitometer may be applied to terminals 10 and 11, with the polarity as indicated. Resistors 12 and 13 are connected in series at junction point 15 and across terminals 10 and 11 to act as a voltage divider. An indicating meter 20 having a uniformly graduated scale may be connected across resistor 13. As explained in my said copending application Serial No. 570,627, the logarithmic compensating means thereof operates in such a manner that meter 20 directly indicates the sample density on a substantially uniformly graduated scale although the electrical values so indicated are derived from logarithmically varying quantities.

With the arrangement thus far described, the scale of meter 20 would be somewhat distorted in terms of the sample density. For low density values and correspondingly low voltage drops across resistor 13, the scale would be very nearly uniformly graduated. On the other hand, for high density values and correspondingly high voltage drops across resistor 13, the scale would be somewhat expanded. This is indicated by the non-compensated voltage-density curve 21 of Fig. 2, wherein curve 22 represents an ideal linear relation between calculated density and the readings of meter 20. For clearer illustration of the added refinement in linear response obtained by this invention, curve 21 representing the output indication of the photomultiplier tube feedback densitometer of my copending application Serial No. 570,627, is distorted as to curvature. While the actual curvature obtained in practice is much less there is a partial non-linearity which when corrected in the manner shown here further enhances the value and utility of these instruments.

If additional resistance would be connected in shunt with resistor 13 at the instant when the meter indication corresponds to point 23 on curve 21, the scale of the meter would be compensated to some extent, since a further increase in the voltage drop across the meter corresponding to indications beyond point 23 on curve 21 would be at a different ratio to the current. In other words the meter indication would be a higher density than that shown for the same point of curve 21. With such additional resistances in shunt with the meter, the meter response would closely approximate that shown by the ideal linear response curve 22.

In the circuit of Fig. 1, such compensation is effected as follows. A battery 25 is provided, preferably having a total voltage equal to or in excess of the total voltage drop across resistor 13 at full scale reading of meter 20. A resistor 26 has one terminal connected to junction point 15 and the other terminal connected, in series with a unilateral current conductive element such as a rectifier 27 having the polarity indicated, to an adjustable tap 28 on battery 25. In actual practice, battery 25 would have a voltage divider connected in parallel therewith and provided with adjustable taps.

Rectifier 27 has the polarity indicated, in that it will conduct current in the direction of the arrow representing its anode, the cathode being connected to the battery 25 thereby receiving a bias voltage of a certain threshold value so as to condition its current conductivity as will be explained later. Preferably the rectifier 27 is of the selenium or other dry disk type which due to its comparatively low internal resistance and other characteristics is exceptionally suitable for the herein intended function. Miniature selenium rectifiers are commercially available and are used in instruments and various electronic circuits. These miniature dry disk rectifiers have a substantially instantaneous response. Consequently, rectifier 27 acts as an instantaneous unilateral current conductive path and permits passage of current through resistor 26 under certain conditions.

A conductor 31 inter-connects terminal 11, one end 32 of resistor 13 and terminal 33 of battery 25. Conductor 31 is common to the various circuits and as such is generally grounded as indicated with the conventional grounding symbol and identified with reference character 30. Under these conditions, as long as the voltage drop across resistor 13, between points 15 and 32 is less than the bias voltage drop between tap 28 and terminal 33, substantially no current will flow through resistor 26 and rectifier 27. Rectifier 27 due to its unilateral current conductivity prevents back flow of current from battery 25 through resistor 26. In the example given the tap 28 is adjusted to a voltage value of the battery 25 corresponding to the voltage drop across resistor 13 indicated by the meter 20 when this meter indication corresponds to the value represented by point 23 on curve 21.

When the voltage drop across resistor 13 indicated by the meter 20 exceeds the value corresponding to that represented by point 23, this voltage will exceed also the bias voltage between tap 28 and terminal 33. Under such conditions, current is permitted to flow through resistor 26 through rectifier 27, and thus resistor 26 is effectively in shunt with resistor 13. Further increases in the voltage drop across resistor 13 thus will not have the same effect as over the lower portion of the scale due to the additional resistance in shunt with resistor 13. In other words the effective circuit impedance which controls the indication of the meter is altered at a desired point on the scale. It is clear that the response curve of the meter is altered from point 23 to point 34, as indicated by the broken line curve 35 of Fig. 2. It should be noted that, for purposes of illustration, the curvature of curve 35 is also exaggerated in Fig. 2.

By including additional resistors in circuit with meter 20 at higher readings in a similar manner, substantially perfect linearity of response may be achieved. For example, a second compensating resistor 36 may be connected to point 15 and in series with another rectifier 37 to a tap 38 at a higher potential point on battery 25. Consequently, when the voltage drop between points 15 and 32 exceeds the threshold value chosen between tap 38 and terminal 33, resistor 36 is likewise effectively in shunt with resistor 13 and resistor 26 in the same manner as previously described. The potential setting of tap 38 may correspond to point 34 on curve 35. The meter response curve is accordingly again compensated as indicated by broken line curve 40. It will be clear, that by connecting a suitable number of resistor rectifier combinations between point 15 and battery 25, a nearly ideal linear response curve may be achieved as represented by curve 22. However, in practice it has been found that two such conductively conditioned shunt circuits comprising a resistor and a rectifier together with suitable bias voltage source achieve sufficient compensation.

Fig. 3 illustrates the application of the invention to a photomultiplier tube feedback circuit direct reading densitometer such as described and claimed in my co-pending application Serial No. 647,932. As therein set forth, the densitometer includes a light source 41 which may, for example, be an incandescent lamp. Light from source 41 is condensed by a lens 42 and directed through a sample 43 mounted on a suitable support 44 onto the cathode 46 of a photomultiplier tube 45. The potentials applied to the elements of phototube 45 are derived from a suitable potentiometer or voltage divider 49 having one terminal connected to the negative terminal 47 of a suitable source of potential. Equi-spaced taps on divider 49 are connected to the dynodes 48 of the multiplier tube, respectively. The other terminal 51 of the voltage divider 49 is connected, through a voltage stabilizing tube 50, to the cathode 52 of a control tube 55.

Anode 53 of phototube 45 is connected to control grid 54 of tube 55. Voltage stabilizing tube 50 is thus so inserted in the circuit as to maintain a constant potential between the anode 53 and the dynode 48 next to the anode in the manner and for the purpose described in my said copending application Serial No. 647,932. A battery 56 has one terminal connected to cathode 52 and the other terminal connected through a resistor 57 to anode 53. Screen grid 58 of tube 55 is connected also to the battery 56. It is seen thus that the battery 56 serves as a fixed potential source for the screen grid 58 of the control tube 55 as well as a fixed potential source in series with the fixed voltage maintained across the voltage stabilizing tube 50 for the anode 53 of the phototube 45 as far as the dynode 48 is concerned.

Anode 60 of control tube 55 is connected to the positive terminal 61 of a voltage source the negative terminal of which connects to terminal 47.

The operation of the circuit thus far described is as follows. With increasing light falling upon cathode 46, increased current flows between anode 53 and dynode 48 of phototube 45. Such increased current flow effects an increase in the voltage drop across resistor 57 so that the bias potential of the grid of control tube 55 relative to cathode 52 increases in accordance with an increase in the light falling upon phototube 45. The conductivity of amplifier tube 55 is correspondingly decreased reducing the potential drop across voltage divider 49. This in turn reduces the dynode potentials of tube 45 and thus the output taken across the voltage divider 49 is an inverse function of the light falling on cathode 46.

As fully explained in my copending application Serial No. 570,627, such operation due to the control action of tube 55 varies the output current of phototube 45, as an inverse logarithmic function of the light incident upon phototube cathode 46 Such incident light is, in turn, an inverse logarithmic function of the density of sample 43, therefore, a direct function of the density of sample 43. Consequently, an indicating meter, such as a milli-ammeter or voltmeter connected in the output circuit of phototube 45, for example, will indicate directly, upon a substantially uniformly graduated scale, the density of sample 43. However, as explained above, the response of such meter although modified to be linear to logarithmic quantities is not absolutely linear over its entire range. For greater linear accuracy therefore, the scale must be compensated, at certain portions and thereby, to achieve the ultimate objective of truly linear scale indication of density values.

In the arrangement shown in Fig. 3, an indicating meter 65 is connected in the output circuit of phototube 45. For this purpose, one terminal of meter 65 is connected to terminal 51 of voltage divider 49. The other terminal of meter 65 is connected to terminal 67 of resistor 68. The latter is connected at junction point 70 to resistor 71, which has the outer terminal connected to the cathode 46 of phototube 45. Resistors 68 and 71 act as series resistances between the meter 65 and the phototube output load resistance which in effect is the voltage divider 47 in a manner similar as described in connection with Fig. 1.

A pair of terminals 72, having the polarity indicated, represents a suitable source of auxiliary supply potential. The voltage of terminals 72 is utilized across a tapped voltage divider 73. The latter forms a divided source of auxiliary potential each half of which is maintained constant by means of stabilizing tubes 77 and 78. The upper half of this voltage divider supplies through the adjustable tap 80 and resistor 79 the bucking current for zero setting of the meter whereas the lower half supplies the biasing potential for the rectifier type compensating shunts in a manner similar to those described in connection with Figure 1.

The compensating action in accordance with this invention will now be described. The scale readings of meter 65 are not truly linear over the whole range of densities without additional compensation as mentioned before. No matter what fixed adjustments are made in the values of resistors 68, 71 or 79, or in any of the other circuit constants the proportion will be fixed. For example, if resistor 71 is reduced in ohmic value and the meter rebalanced to zero by a corresponding reduction of the ohmic value of the resistor 79, the sole result is to amplify all of the density readings. Nevertheless, a set of values in resistors 68, 71 and 79 can be found which will give a more accurate linear reading of meter 65 for densities up to about 0.90. At higher densities, the meter readings will be in error and here a shunt effect in the series resistance of the meter is desirable. For the latter purpose, a pair of resistors 81 and 82 are each connected, in series with a rectifier 83 or 84, respectively, to respective taps 86 and 87 on potentiometer 73. The other terminals of resistors 81 and 82 are commonly interconnected to the junction point 70. Preferably, dry disk rectifiers are used for elements 83 and 84 because of the large reverse voltage developed at low densities.

With the described arrangement, when the voltage drop across resistor 71 exceeds the potential of tap 87, resistor 82 automatically carries current and in effect is in parallel circuit relation with meter 65. A similar action with respect to resistor 81 takes place when the voltage drop across resistor 71 exceeds the potential of tap 86. The result is to achieve more accurate linearity of response of meter 65 with respect to density values of sample 43.

This condition is graphically illustrated in Fig. 4, wherein broken line curve 90 represents the response of meter 65 without the compensating circuit, solid curve 91 represents theoretically perfect linear response and the curve comprising dots 92 represents the actual response of the meter with the compensating circuit added.

As a typical example, the data for the curves of Fig. 4 were taken with a Weston model 273 milliammeter having a 1.0 ma. scale reading and a 30-ohm coil resistance. The scale was calibrated for density values from 0.0 to 3.0 as a uniform function of input current. The other pertinent circuit constants were as follows:

| | |
|---|---|
| Voltage-ground-tap 80_____volts__ | 0.5 |
| Ground-tap 86_____do___ | 33.0 |
| Ground-tap 87_____do___ | 41.0 |
| Resistor 71_____ohms__ | 120,000 |
| Resistor 68_____do___ | 10,000 |
| Resistor 81_____do___ | 25,000 |
| Resistor 82_____do___ | 0 |
| Resistor 79_____do___ | 2,300 |

A colorfilm sensitometer strip was used as sample 43 and was calibrated on a Martens spectrophotometer at 660 millimicrons, and the circuit constants were adjusted to give the best correlation with these readings when a sharp cutting red filter was used. The readings in the table below were made under the following conditions: (a) Resistors 81 and 82 and rectifiers 83 and 84 disconnected, (b) resistor 81 and rectifier 83 connected, and resistor 82 and rectifier 84 disconnected, and vice versa, and (c) resistors 81 and 82 and rectifiers 83 and 84 connected as shown in Fig. 3.

| Actual Density | Uncompensated Meter Reading | Partially Compensated Reading 1 | Partially Compensated Reading 2 | Fully Compensated Reading |
|---|---|---|---|---|
| 0.65 | 0.65 | 0.65 | 0.65 | 0.65 |
| 0.74 | 0.74 | 0.73 | 0.74 | 0.73 |
| 0.85 | 0.85 | 0.83½ | 0.85 | 0.83½ |
| 0.94 | 0.98 | 0.96 | 0.98 | 0.96 |
| 1.08 | 1.13 | 1.10 | 1.13 | 1.10 |
| 1.21 | 1.30 | 1.24 | 1.29 | 1.23 |
| 1.38 | 1.49 | 1.40 | 1.46 | 1.38 |
| 1.55 | 1.67 | 1.55 | 1.63 | 1.52 |
| 1.71 | 1.88 | 1.73 | 1.82 | 1.68 |
| 1.90 | 2.20 | 1.96 | 2.16 | 1.89 |
| 2.16 | 2.60 | 2.28 | 2.32 | 2.15 |
| 2.39 | 3.00 | 2.64 | 2.56 | 2.39 |

[1] Only resistor 81 and rectifier 83 in meter circuit.
[2] Only resistor 82 and rectifier 84 in meter circuit.

The rectifiers do not act as zero resistance connections since there is some internal resistance therein when the potential 86, for example, is positive with respect to the potential of point 70. The effective resistance of the rectifiers decreases with increasing rectifier current. This effect is very desirable, however, since it presents an increasingly lower shunt to meter 65 as the specimen density, and thus the voltage between points 51 and 70 increases. Furthermore, it provides a smooth transition between the uncompensated and compensated portions of the meter response curves.

With the described invention it is also possible to expand the meter scale above normal by simply reversing the relative polarity of rectifiers 83 and 84. Under these conditions, resistors 81 and 82 will be in shunt with meter 65 at lower density values and will be cut out at higher density values. This effect is graphically illustrated in Fig. 5, wherein broken line curve 93 represents the normal response of meter 65 and curve 94 represents the response in obtaining a scale expanded beyond normal.

Also, by having one rectifier connected with the polarity as shown in Fig. 3 and having the other rectifier reversed, scale expansion and contraction can be obtained for various portions of the scale as desired. For example, if rectifier 83 is reversed in polarity to that shown in Fig. 3, and rectifier 84 retains the polarity indicated, the middle portion of the meter scale, corresponding to density values in which the potential of point 70 falls between that of taps 86 and 87, will be expanded and the scale readings for higher and lower density values will be relatively contracted. Such scale expansion is often desirable where readings over a certain portion of the scale must be taken to a higher degree of accuracy than other portions of the scale.

The described arrangement provides compensating means for electrical meters whereby the scales of the meters may be made linear, or may be expanded or contracted as desired, for specialized applications where accuracy of indication is a prime requisite. The compensation is effected instantaneously whenever the relative potential values are such that the rectifiers become conductive to pass current through their associated resistors in effective circuit relation with the meter. The arrangement is also simple and easily incorporated in various instruments, such as densitometers, by using dry disk oxide type rectifiers which are available with very small dimensions.

While specific embodiments of the invention have been shown and described in detail to illustrate the application of the principles thereof, it will be understood that the invention may be otherwise embodied without departing from such principles.

What is claimed is:

1. A compensating circuit for electrical measuring instruments comprising, in combination, a measuring instrument, a source of electrical energy to be measured, impedance means connected to said instrument determining the normal response of said instrument with respect to said energy, a circuit including said impedance means comprising an auxiliary impedance element electrically inter-connected with said response determining means, and a unilateral current conductive element in said circuit adapted to conduct current through said auxiliary impedance element and thereby form a shunt circuit with said response determining means, and means for conditioning current conductivity of said unilateral current conductive element at a desired indicating level of said instrument whereby said response determining means is shunted and the normal indication of said instrument is altered.

2. A compensating circuit for electrical measuring instruments comprising, in combination, a measuring instrument, a source of electrical energy to be measured, impedance means connected to said instrument determining the normal response of said instrument with respect to said energy, a circuit including said impedance means comprising a plurality of auxiliary impedance elements electrically inter-connected with said response determining means, and a plurality of unilateral current conductive elements in said circuit each adapted to conduct current through one of said auxiliary impedance elements and thereby form shunt circuits with said response determining means, and means for conditioning current conductivity of said unilateral current conductive elements at desired indicating levels of said instrument whereby said response determining means is shunted at said levels and the normal indication of said instrument is altered at a plurality of points of indication representing said levels.

3. A compensating circuit for electrical measuring instruments comprising, in combination, a measuring instrument, a source of electrical energy to be measured, impedance means connected to said instrument determining the normal response of said instrument with respect to said energy, a circuit including said impedance means comprising an auxiliary impedance element electrically inter-connected with said response determining means, and a unilateral current conductive element comprising a rectifier in said circuit adapted to conduct current through said auxiliary impedance element and thereby form a shunt circuit with said response determining means, and voltage means for biasing said rectifier and thereby conditioning current conductivity thereof at a desired indicating level of said instrument whereby said response determining means is shunted and the normal indication of said instrument is altered.

4. A compensating circuit for electrical measuring instruments comprising, in combination, a measuring instrument, a source of electrical energy to be measured, impedance means connected to said instrument determining the normal response of said instrument with respect to said energy, a circuit including said impedance means comprising an auxiliary impedance element electrically inter-connected with said response determining means, and a unilateral current conductive element comprising a rectifier in said circuit adapted to conduct current through said auxiliary impedance element and thereby form a shunt circuit with said response determining means, and voltage means for biasing said rectifier and thereby conditioning current conductivity thereof beyond a predetermined energy level in said response determining means whereby said response determining means is shunted and the normal indication of said instrument is altered.

MONROE H. SWEET.

REFERENCES CITED

The following references are of record in the file of this patent:

UNITED STATES PATENTS

| Number | Name | Date |
|---|---|---|
| 2,118,933 | Macadie | May 31, 1938 |
| 2,305,952 | Cravath | Dec. 22, 1942 |
| 2,325,179 | Doering | July 27, 1943 |
| 2,361,549 | Kott | Oct. 31, 1944 |
| 2,400,190 | Clark | May 14, 1946 |
| 2,406,716 | Sweet | Aug. 27, 1946 |
| 2,407,564 | Martin | Sept. 10, 1946 |
| 2,417,023 | Sweet | Mar. 4, 1947 |

FOREIGN PATENTS

| Number | Country | Date |
|---|---|---|
| 432,366 | Germany | Aug. 3, 1926 |

OTHER REFERENCES

Vacuum Tube Voltmeters, published by J. F. Rider Publishing Co., New York 16, N. Y., (page 29), published February 1941.